(12) United States Patent
Wu et al.

(10) Patent No.: US 6,248,688 B1
(45) Date of Patent: *Jun. 19, 2001

(54) CATALYST COMPOSITION CONTAINING OXYGEN STORAGE COMPONENTS

(75) Inventors: Joseph H. Z. Wu, Somerset, NJ (US); Mukaram K. Syed, Huntsville, AL (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

This patent is subject to a terminal disclaimer.

(21) Appl. No.: 09/238,181

(22) Filed: Jan. 28, 1999

Related U.S. Application Data

(63) Continuation-in-part of application No. 08/722,761, filed on Dec. 23, 1996, now Pat. No. 5,898,014.

(51) Int. Cl.$^7$ ................ B01J 23/10; B01J 23/54
(52) U.S. Cl. .................. 502/302; 502/303; 502/304; 502/326; 502/327; 502/336; 502/339; 502/335
(58) Field of Search .................. 502/302, 303, 502/304, 326, 327, 332, 335, 336, 339

(56) References Cited

U.S. PATENT DOCUMENTS

| | | | |
|---|---|---|---|
| 3,524,721 | 8/1970 | Stephens ................................. | 23/2 |
| 3,545,917 | 12/1970 | Stephens ................................. | 23/2 |
| 3,552,913 | 1/1971 | Stephens ................................. | 23/2 |
| 3,676,370 | 7/1972 | Stephens ............................. | 252/455 |
| 3,787,560 | 1/1974 | Stephens ............................. | 423/239 |
| 3,857,899 | 12/1974 | Tasaka et al. .................... | 260/621 R |
| 3,899,444 | 8/1975 | Stephens ............................. | 252/455 |
| 3,956,188 | 5/1976 | Hindin et al. ....................... | 252/465 |
| 3,993,572 | 11/1976 | Hindin et al. ....................... | 252/462 |
| 4,013,694 | 3/1977 | Fishel ............................ | 260/346.2 M |
| 4,021,185 | 5/1977 | Hindin et al. ........................... | 431/7 |
| 4,134,860 | 1/1979 | Hindin et al. ....................... | 252/466 |
| 4,157,316 | 6/1979 | Thompson et al. ................. | 252/462 |
| 4,171,288 | 10/1979 | Keith et al. ........................ | 252/462 |
| 4,294,726 | 10/1981 | Bozon et al. ....................... | 252/462 |
| 4,438,219 | 3/1984 | Brandenburg et al. ............. | 502/333 |
| 4,476,246 | 10/1984 | Kim et al. .......................... | 502/304 |
| 4,504,598 | 3/1985 | Ono et al. .......................... | 602/303 |
| 4,587,231 | 5/1986 | Sawamura et al. ................. | 502/304 |
| 4,591,518 | 5/1986 | Schillinger et al. ............. | 427/385.5 |
| 4,591,578 | 5/1986 | Foley et al. ........................ | 502/185 |
| 4,591,580 | 5/1986 | Kim et al. .......................... | 502/303 |
| 4,624,940 | 11/1986 | Wan et al. .......................... | 502/251 |
| 4,708,946 | 11/1987 | Ohata et al. ....................... | 502/304 |
| 4,714,694 | 12/1987 | Wan et al. .......................... | 502/304 |
| 4,727,052 | 2/1988 | Wan et al. .......................... | 502/327 |
| 4,780,447 | 10/1988 | Kim et al. .......................... | 502/243 |
| 4,806,519 | 2/1989 | Chiba et al. ....................... | 502/252 |
| 4,808,564 | 2/1989 | Matsumoto et al. ................ | 502/303 |
| 4,923,842 | 5/1990 | Summere ............................. | 502/261 |
| 4,965,243 | 10/1990 | Yamada et al. .................... | 502/304 |
| 5,057,483 | 10/1991 | Wang .................................. | 502/304 |
| 5,212,142 | 5/1993 | Dettling ............................ | 502/304 |

FOREIGN PATENT DOCUMENTS

| | | |
|---|---|---|
| 615721 | 8/1989 | (AU) . |
| 50-145381A | 11/1975 | (JP) . |
| 57-105240A | 6/1982 | (JP) . |
| 59-052530A | 3/1984 | (JP) . |
| 59-127649A | 7/1984 | (JP) . |
| 60-019036B4 | 5/1985 | (JP) . |
| 85031828B | 7/1985 | (JP) . |
| 60-232253A | 11/1985 | (JP) . |
| D71538/87 | 4/1987 | (JP) . |
| 63-007895A | 1/1988 | (JP) . |
| 63-077544A | 4/1988 | (JP) . |
| 63-205141A | 8/1988 | (JP) . |
| 63-240947A | 10/1988 | (JP) . |
| 01210032 | 8/1989 | (JP) . |
| WO95/00235 | 1/1995 | (WO) . |
| WO 95/35152 | 12/1995 | (WO) ................ B01D/53/94 |
| WO 98/13139 | 4/1998 | (WO) ................ B01J/23/10 |

*Primary Examiner*—Bekir L. Yildirim
(74) *Attorney, Agent, or Firm*—Richard A. Negin

(57) ABSTRACT

The present invention relates to a zirconium, rare earth containing composition comprising zirconium, cerium, neodymium and praseodymium components and the use of this composition in a catalyst composition useful for the treatment of gases to reduce contaminants contained therein and method process to make the catalyst composition. The catalyst has the capability of substantially simultaneously catalyzing the oxidation of hydrocarbons and carbon monoxide and the reduction of nitrogen oxides.

30 Claims, No Drawings

CATALYST COMPOSITION CONTAINING OXYGEN STORAGE COMPONENTS

CROSS-REFERENCE TO RELATED APPLICATION

This application is a continuation-in-part of U.S. application Ser. No. 08/722,761, Dec. 23, 1996 now U.S. Pat. No. 5,898,014.

BACKGROUND OF THE INVENTION

1. Field of the Invention

The present invention relates to a zirconium, rare earth containing composition comprising zirconium, cerium, neodymium and praseodymium components and the use of this composition in a catalyst composition useful for the treatment of gases to reduce contaminants contained therein and method process to make the catalyst composition. The present invention relates to an improved catalysts of the type generally referred to as "three-way conversion" or "TWC" catalysts. TWC catalysts have the capability of substantially simultaneously catalyzing the oxidation of hydrocarbons and carbon monoxide and the reduction of nitrogen oxides.

2. Discussion of Related Art

Three-way conversion catalysts (TWC) have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

High surface area alumina support materials, also referred to as "gamma alumina" or "activated alumina", typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C. or higher, and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al U.S. Pat. No. 4,171,288.

Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina supported catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

European Patent Application 95/01849 (Publication No. 95/35152) discloses a layered catalyst composite including an oxygen storage composition which comprises a diluent such as zirconia, ceria, and one or more rare earth oxides selected from lanthana, neodymia and yttria. Also disclosed as oxygen storage components are praseodymia, ceria and neodymia which can be applied as soluble salts to a catalyst composition.

U.S. Pat. Nos. 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide. Palladium containing catalyst compositions, e.g., U.S. Pat. No. 4,624,940, have been found useful for high temperature applications. The combination of lanthanum and barium is found to provide a superior hydrothermal stabilization of alumina which supports the catalytic component, palladium.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500 to 700° C. in air after which the material is impregnated with an aqueous solution of a salt of platinum and a salt of rhodium dried and subsequently treated in a hydrogen-containing gas at a temperature of 250–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is disclosed as an $H_2S$ gettering compound.

U.S. Pat. No. 4,965,243 discloses a method to improve thermal stability of a TWC catalyst containing precious metals by incorporating a barium compound and a zirconium compound together with ceria and alumina. This is disclosed to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound. These patents suggest the utility of alkaline earth metals in combination with ceria, and zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g. co-precipitated) ceria-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or other activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545,917, 3,524,721 and 3,899,444 all disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, cerium, praseodymium, neodymium and others.

TWC catalyst systems comprising a carrier and two or more layers of refractory oxide are disclosed. One of the purposes of using catalysts having two or more layers is to isolate constituents of compositions in different layers to prevent interaction of the catalysts. Disclosures regarding catalysts comprising two or more layers are included in U.S. Ser. No. 08/645,985 and in European Patent Application Nos. 95/00235 and 95/01849, Japanese Patent Publication Nos. 105240/1982, 52530/1984, 19036/1985, 31828/1985 and 232253/1985.

Japanese Patent Publication No. 145381/1975 discloses a catalyst-supported structure for purifying exhaust gases comprising a thermally insulating ceramic carrier and at least two layers of catalyst containing alumina or zirconia, the catalysts in the catalyst containing alumina or zirconia layers being different from each other.

Japanese Patent Publication No. 127649/1984 discloses a catalyst for purifying exhaust gases, comprising an inorganic carrier substrate such as cordierite, an alumina layer formed on the surface of the substrate and having deposited thereon at least one rare earth metal such as lanthanum and cerium and at least one of platinum and palladium, and a second layer formed on the aforesaid first alumina-based layer and having deposited thereon a base metal such as iron or nickel, and at least one rare earth metal such as lanthanum, and rhodium.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

U.S. Pat. No. 4,806,519, discloses a two layer catalyst structure having alumina, ceria and platinum on the inner layer and aluminum, zirconium and rhodium on the outer layer.

JP-88-240947 discloses a catalyst composite which includes an alumina layer containing ceria, ceria-doped alumina and at least one component selected from the group of platinum, palladium and rhodium. There is a second layer containing lanthanum-doped alumina, praseodymium-stabilized zirconium, and lanthanum oxide and at least one component selected from the group of palladium and rhodium. The two layers are placed on a catalyst carrier separately to form a catalyst for exhaust gas purification.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

Japanese Patent J-63-007895-A discloses an exhaust gas catalyst comprising two catalytic components, one comprising platinum dispersed on a refractory inorganic oxide support and a second comprising palladium and rhodium dispersed on a refractory inorganic oxide support.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium and praseodymium.

U.S. Pat. No. 5,057,483, referred to above, discloses a catalyst composition suitable for three-way conversion of internal combustion engine, e.g., automobile gasoline engine, exhaust gases and includes a catalytic material disposed in two discrete coats on a carrier. The first coat includes a stabilized alumina support on which a first platinum catalytic component is dispersed. The first coat also includes bulk ceria, and may also include bulk iron oxide, a metal oxide (such as bulk nickel oxide) which is effective for the suppression of hydrogen sulfide emissions, and one or both of baria and zirconia dispersed throughout as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

It is a continuing goal to develop a three-way catalyst system which is inexpensive and stable. At the same time the system should have the ability to oxidize hydrocarbons and carbon monoxide while reducing nitrogen oxides to nitrogen.

SUMMARY OF THE INVENTION

The present invention relates to a composition, preferably a composite comprising a diluent component selected from zirconia and zirconia activated alumina and rare earth composition comprising and requiring zirconium, cerium, neodymium and praseodymium components and the use of this zirconium, rare earth composition in a catalyst composition, method of preparing the composition and the method of using the composition. In accordance with the preferred method, the composite is a precipitated composite.

The zirconium, rare earth composition of the present invention preferably comprises ceria, praseodymium, neodymium, rare earth components and a zirconium component. The rare earth components and the zirconium component are preferably in the form of oxide components. The preferred composition is a composite which comprises in weight percent from 40 to 80, and preferably 45 to 70, more preferably 50 to 60, yet more preferably 45 to 55 and most preferably 47 to 53 weight percent zirconia, 10 to 60, preferably 20 to 40, more preferably 25 to 35, yet more preferably 30 to 45 and most preferably 32 to 38 weight percent ceria, 2 to 15, preferably 5 to 10, preferably 7 to 10, and most preferably 6 to 10 weight percent neodymia, and 2 to 15, preferably 5 to 10, preferably 7 to 10, and most preferably 6 to 10 weight percent praseodymia. There is preferably a minimum of 40 weight percent zirconia, and a maximum of 80 weight percent zirconia, a minimum of 10 percent ceria and a maximum of 60 percent ceria, a minimum of 2 percent neodymia and a maximum of 15 percent neodymia and a minimum of 2 percent praseodymia and a maximum of 15 percent praseodymia. The zirconium, rare earth composition preferably comprises by weight ratios based on ceria to zirconia of from 1:1 to 1:3, a weight ratio of ceria to praseodymia of from 5:1 to 1:1 and a weight ratio of ceria to neodymia of from 5:1 to 1:1. Preferred compositions comprise at least 50 weight percent zirconia in which is incorporated the rare earth compounds and precipitated to form an oxide composite. A preferred composite comprises 28 weight percent $CeO_2$, 7 weight percent $Pr_6O_{11}$, 7 weight percent $Nd_2O_3$ and 58 weight percent $_2ZrO$. A more preferred composite comprises 32 to 38 (most preferably 34 to 35) weight percent $CeO_2$, 6 to 10 weight percent $Pr_6O_{11}$, 6 to 10 weight percent $Nd_2O_3$ and 47 to 53 (most preferably 49 to 50) weight percent $ZrO_2$. The particle size of the composite varies from about 0.5 to about 20 micrometers with preferred particles being less than about 15 micrometers and more preferably less than 10 micrometers.

A process which can be used to make this composition begins with making a zirconium hydroxide sol. This can be made by precipitating zirconium sulfate with sodium hydroxide at high temperature reflux, typically from 90 to 100° C. to make nanometer size crystals (typically up to about 100 nanometers). The sulfur, sodium and other impurities can be washed out with an aqueous liquid. An acid, such as nitric acid $HNO_3$, can be used to break the aggregates to obtain the zirconia hydroxide sol and to reduce the pH of the liquid. At this stage, other components such as cerium, praseodymium and neodymium salts such as nitrates can be added. The compounded sol should be sufficiently acidic, a pH of preferably 0.5 to 3 and more preferably 0.5 to 2.0 at this point, to keep the salts in solution. The pH can be quickly increased by adding an alkaline compound such as ammonia to precipitate the rare earth compounds. The pH should be controlled to avoid formation of large aggregates. The precipitated material can then be washed with an aqueous liquid such as deionized water and dried at suitable conditions in air such as air in an oven up to 250° C. typically at 150° C. for as long as necessary, typically overnight. The precipitate can then be calcined to convert the compound to oxides. The calcination conditions can be from 450 to 750° C. with a preferred calcination condition being at 550° C. for a period of from 0.5 to 10 hours and preferably 2 hours. During this time the rare earth oxides can diffuse into the zirconia.

A catalyst composition of the present invention comprises at least one support, at least one precious metal component and at least one zirconium, rare earth composition as recited above.

The precious metal component comprises one or more precious metals selected from the group consisting of gold, silver and platinum group metals where preferred platinum group metals include platinum, palladium, rhodium and iridium with palladium most preferred.

The support materials are preferably refractory oxide materials which are preferably selected from the group from including silica, alumina and titania compounds. Particularly preferred supports are activated, high surface area compounds selected from the group consisting of alumina, silica, silica-alumina, alumino-silicates, alumina-zirconia, alumina-chromia and alumina-ceria.

Other materials which can be included in the catalyst composition include rare earth metals, and optionally at least one stabilizer and optionally a zirconia compound. The rare earth metal compound can be selected from at least one of the group consisting of praseodymium components and neodymium components and preferably both. The catalyst composition can further comprise a nickel or iron component.

The stabilizer can be any useful stabilizer for TWC catalyst compositions with preferred stabilizers including alkaline earth metal components derived from a metal selected from the group consisting of magnesium, barium, calcium and strontium. The catalyst composition preferably comprises a zirconia compound praseodymia, neodymia and an alkaline compound.

A specific catalyst composition where the above recited oxygen storage composition is preferred comprises, based on catalyst loading on a substrate, from about 0.001 to about 0.3 g/in$^3$ (based on the metal) of at least one first precious metal component, preferably palladium, from about 0.15 to about 2.0 g/in$^3$ of the support, preferably alumina, from about 0.025 to about 0.5 g/in$^3$ of at least one alkaline earth metal component, from about 0.025 to about 0.5 g/in$^3$ of the zirconium component, and from about 0.025 to about 0.5 g/in$^3$ each of at least one rare earth metal component selected from the group consisting of lanthanum metal components and neodymium metal components, and from 0.01 to 2.0 g/in$^3$ and preferably 0.1 to 1.0 g/in$^3$ of the zirconia, rare earth compositions described above. The composition can additionally comprise about 0.0 to 5 g/in$^3$ and preferably about 0.5 g/in$^3$ to 3 g/in$^3$ of a nickel compound.

The catalyst composition of the present invention can be in the form of a pellet or in the form of layer supported on a substrate. The preferred substrate is a honeycomb catalyst carrier which can be made of metal or ceramic. The composition, in the form of a layer, can be supported on the substrate.

The present invention additionally includes a method of preparing the composition including the steps of forming a complete slurry of a liquid vehicle and the catalyst composition where the catalyst composition comprises at least one first precious metal component supported on at least one support. The method can yet further comprise the steps of fixing at least one precious metal component onto at least one support. The precious metal which is fixed to the support can be segregated from components which may have a negative impact on the catalytic activity of that precious metal on other supports in the composition. The fixing step can be suitable fixing steps known in the art such as chemically fixing or thermally fixing. A preferred fixing step is to thermally fix the precious metal to the support. This is preferably conducted in air at from 50° C. to about 550° C. from 0.5 to about 2.0 hours. The method can additionally comprise steps of adding additional materials to either the slurry including materials such as the recited rare earth metal components, the oxygen storage component, at least one stabilizer and/or a zirconia component.

Additional materials can then be added to the slurry. Finally, the method can comprise a step of coating a substrate with the slurry.

The present invention results in effective catalyst which can be effectively used in a single layer as a TWC catalyst.

DETAILED DESCRIPTION OF THE PREFERRED EMBODIMENTS

Following is a detailed description of the preferred embodiments of the present zirconium, rare earth composition, its use in a catalyst composition, method of preparation and use.

The zirconium, rare earth composition of the present invention preferably comprises ceria, praseodymium, neodymium, rare earth components and a zirconium component. The rare earth components and the zirconium component are preferably in the form of oxide components. The preferred composition is a composite which comprises in weight percent from 40 to 80, and preferably 45 to 70, more preferably 50 to 60, yet more preferably 45 to 55 and most preferably 47 to 53 weight percent zirconia, 10 to 60, preferably 20 to 40, more preferably 25 to 35, yet more preferably 30 to 45 and most preferably 32 to 38 weight percent ceria, 2 to 15, preferably 5 to 10, preferably 7 to 10, and most preferably 6 to 10 weight percent neodymia, and 2 to 15, preferably 5 to 10, preferably 7 to 10, and most preferably 6 to 10 weight percent praseodymia. There is preferably a minimum of 40 weight percent zirconia, and a maximum of 80 weight percent zirconia, a minimum of 10 percent ceria and a maximum of 60 percent ceria, a minimum of 2 percent neodymia and a maximum of 15 percent neodymia and a minimum of 2 percent praseodymia and a maximum of 15 percent praseodymia.

The zirconium rare earth composition is believed to function as an oxygen storage component.

The zirconium, rare earth composition preferably comprises by weight ratios based on ceria to zirconia of from 1:1 to 1:3, a weight ratio of ceria to praseodymia of from 5:1 to 1:1 and a weight ratio of ceria to neodymia of from 5:1 to 1:1. Preferred compositions comprise at least 50 weight percent zirconia in which is incorporated the rare earth compounds and precipitated to form an oxide composite.

The particle size of the composite varies from about 0.1 to about 20 micrometers with preferred particles being less than about 15 micrometers and preferably less than about 10 micrometers.

The present invention is also directed to a catalyst composition of the type useful as a three-way conversion catalyst or a TWC. The TWC catalyst composite of the present invention can simultaneously catalyzes the oxidation of hydrocarbons and/or carbon monoxide and the reduction of nitrogen oxides present in a gas stream. The catalyst composition comprises at least one first support, at least one first precious metal component and the zirconium, rare earth composition.

The catalyst composition of the present invention is directed to a method of using the catalyst composition and a method of preparation of the catalyst composition. The present invention also includes a pellet or supported layer(s) of the catalyst composition. The catalyst composition has been found to be effective as a single layer. The layer(s) can be supported on a suitable substrate such as a monolithic catalyst honeycomb.

A specific composition using the above-recited oxygen storage composition comprises a catalytically effective amount of a platinum or palladium component, preferably palladium with typically 5 to 400 g/ft$^3$ and more typically 15 to 250 g/ft$^3$ and preferably 50 to 200 g/ft$^3$ of a palladium component. Platinum can be used at from 0 to 100 g/ft$^3$, and when used is typically in an amount of at least 0.1 g/ft$^3$ and more typically 0.5 to 100 g/ft$^3$ and more preferably from 5 to 75 g/ft$^3$ by weight of platinum component.

The performance of the platinum group precious metal components can be enhanced by the use of a stabilizer, preferably alkaline earth metals, promoters preferably selected from lanthanum and neodymium or both, and a zirconium component. The catalyst composition additionally includes the zirconium, rare earth composition recited above, and optionally, other oxygen storage component can also be included.

The support preferably comprises a high surface area refractory oxide support. Typically, the particles of the support have at least 80% of the particles having an average diameter of less than 25 microns and more typically the support has 90% of the particles having an average diameter of less than 20 micrometers. For the purpose of the present invention, particle size is measured using a Brinkman particle size analyzer. The particle size distribution is indicated by a percent of particles having an average particle diameter less than a given number in micrometers. Nominally, particles of the combination of precious metal and other components supported on a support are considered to have the same particle size as the support.

Useful high surface area supports include one or more refractory oxides. These oxides include, for example, silica and alumina, include mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 350 m$^2$/g.

The catalyst of this invention comprises at least one precious metal component in an amount sufficient to provide compositions having significantly enhanced catalytic activity to oxidize hydrocarbons and carbon monoxide and reduce nitrogen oxides. As used herein, the term "precious metal components" include gold, silver and "platinum group metal component" including the recited platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide.

The precious metal component, such as a platinum group metal catalytic component, can be a suitable compound, and/or complex of any of the platinum group metals to achieve dispersion of the catalytic component on the support, preferably activated alumina and/or ceria-zirconia composite support particles. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

The preferred precious metal component of the specific catalyst composition is a palladium component on the support used in a layer to coat a monolithic honeycomb substrate comprises a loading of from 5 to 300 g/ft$^3$.

The catalyst composition of the present invention preferably contains an oxygen storage component with the supported precious metal component, i.e., palladium. The oxygen storage component is the composition recited above comprising rare earth components including cerium, praseodymium and neodymium compounds, and a zirconium components.

The oxygen storage composition is preferably in bulk form. By bulk form it is meant that the oxygen storage composition is present as discrete particles which may be as small as 0.1 to 15 micrometers in diameter or smaller, as opposed to having been dissolved in solution with the support precious metal. A description and the use of bulk components is presented in U.S. Pat. No. 4,714,694, hereby incorporated by reference. As noted in U.S. Pat. No. 4,727,052, also incorporated by reference, bulk form includes oxygen storage composition particles of ceria admixed with particles of zirconia, or zirconia activated alumina. It is particularly preferred to dilute the oxygen storage component as part of an oxygen storage component composition.

The oxygen storage component composition can comprise an oxygen storage component, ceria and a diluent component preferably zirconia. Additionally, the present oxygen storage composition comprises neodymium and praseodymium components. These are believed to stabilize the cerium component and avoid interaction of cerium and the palladium compound. The praseodymium additionally is believed to act as an oxygen storage component. The diluent component can be any suitable filler which is inert to interaction with platinum group metal components so as not to adversely affect the catalytic activity of such components. A useful diluent material is a refractory oxide with preferred refractory oxides being of the same type of materials recited below for use as catalyst supports. Most preferred is a zirconium compound with zirconia most preferred. The oxygen storage composition is therefore stabilized against deactivating when used in high temperature environments such temperature of from 550° C. to 1100° C.

A preferred oxygen storage composition in the specific composition comprises the ceria-zirconia composite additionally containing neodymia and praseodymia in amount recited. The zirconium, rare earth composition recited above is in particulate form to permit the ceria, neodymia, praseodymia and zirconia to be in proximity to each other. It is believed that particles containing these components benefit by their interaction. So long as this proximity of components is maintained the composition can be added to the catalyst composition in any form, preferably bulk (particulate) form.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the composition of the present invention preferably use alkaline earth metal components. The alkaline earth metal components are preferably alkaline earth metal oxides. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides. The amount of stabilizer can be from 0.05 to 30 weight percent based on the weight of the support material and stabilizer.

The composition can contain an additional zirconium compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The composition preferably contains at least two promoters selected from the group consisting of praseodymium metal components and neodymium metal components with the preferred components being praseodymium oxide (praseodymia) and neodymium oxide (neodymia). While these compounds are disclosed to act as stabilizers, they can also act as reaction promoters. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen. The praseodymium compound may also provide as an oxygen storage function.

The praseodymium and/or neodymium components are in the form of their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

The composition of the present invention can contain other conventional additives such as sulfide suppressants, e.g., nickel or iron components. If nickel oxide is used, an amount from about 1 to 25% by weight of the first coat can be effective, as disclosed in commonly owned Ser. No. 07/787,192, hereby incorporated by reference.

A particularly useful catalyst composition of the present invention comprises from about 0.001 to 0.5 $g/in^3$ of at least one precious metal such as a palladium component; from about 0.15 to about 3.0 $g/in^3$ of a support, i.e., alumina; from about 0.0 to 0.02 $g/in^3$ of a second platinum component such as a rhodium component; at least about 0.05 $g/in^3$ and preferably from about 0.1 to about 1.0 $g/in^3$ of the recited oxygen storage component, preferably a composite of ceria, zirconia, neodymia and praseodymia; from about 0.01 to about 0.5 $g/in^3$ of at least one first alkaline earth metal components; from about 0.025 to about 0.5 $g/in^3$ of a zirconium component; and from about 0.01 to about 0.5 $g/in^3$ of each rare earth metal components selected from the group consisting of lanthanum metal components and neodymium metal components. The composition can further comprise from about 0.025 $g/in^3$ to about 0.5 $g/in^3$ of a nickel component.

The catalyst composition can be coated as a layer on a monolithic substrate generally which can comprise a loading of from about 0.50 to about 6.0, preferably about 1.0 to about 5.0 $g/in^3$ of catalytic composition based on grams of composition per volume of the monolith.

The catalyst composition of the present invention can be made by any suitable method. A preferred method comprises mixing a mixture of a solution of at least one water-soluble, palladium component, and finely-divided, high surface area, refractory oxide which is sufficiently dry to absorb essentially all of the solution to form a first slurry. The palladium component is preferably comminuted in the first slurry. Preferably, the slurry is acidic, having a pH of less than 7 and preferably from 2 to 7. The pH is preferably lowered by the addition of an acid, preferably acetic acid to the slurry. In particularly preferred embodiments the slurry is comminuted to result in substantially all of the solids having particle sizes of less than about 20 micrometers in average diameter. The supported palladium component in the resulting slurry can be converted to a water insoluble form by a fixing step. The palladium component can be converted to insoluble form thermally, chemically or by calcining. The precious metal can be thermally fixed to the support in air at preferably at about 50° C. to 550° C. for from 0.5 to 2.0 hours.

A slurry containing a supported palladium component can be mixed with additives such as the recited oxygen storage components, stabilizers, rare earth metal components, and zirconium components and the like.

The slurry useful for the present compositions can also be prepared by the method in disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. The composite remains essentially dry, i.e. it has substantially no separate or free liquid phase. During the latter process the metal component can be fixed on the support.

After the catalytically-promoting metal solution and high area refractory oxide support are combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of catalytically-promoting metal components are deposited on a support, fixing may be employed after each metal component deposition or after deposition of a plurality of such metal components.

A slurry containing the fixed, catalytically-promoting metal component can be combined with various other additives, as recited and comminuted as a slurry which is preferably acidic, to provide solid particles that are advantageously primarily of a size of less than about 20 microns. The slurry can be used to coat a macrosize carrier, typically having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions.

The method provides compositions of uniform and certain catalytically-promoting metal content since essentially all of the platinum group metal component thereby added to the preparation system remains in the catalyst, and the compositions contain essentially the calculated amount of the active catalytically-promoting metal components. In some instances a plurality of catalytically-active metal components may be deposited simultaneously or sequentially on a given refractory oxide support. The intimate mixing of separately prepared catalytically-promoting metal component refractory oxide composites of different composition made by the procedure of this invention, enables the manufacture of a variety of catalyst whose metal content may be closely controlled and selected for particular catalytic effects. The composition may have a platinum group metal component on a portion of the refractory oxide particles, and a base metal component on a different portion of the refractory oxide particles. This process is advantageous in that it provides catalysts which can be readily varied and closely controlled in composition.

In making catalysts by this invention, the catalytically-active composition derived from the slurry, having fixed or water-insoluble catalytically-promoting metal components and high area supports can be combined with a macrosize carrier, preferably of low total surface area. In order to deposit the catalytically-promoting group metal-support catalyst structure of one or more layers on the macrosized carrier, one or more comminuted complete slurries are applied to the carrier in any desired manner. Different compositions made in accordance with the present invention can be applied in separate layers. Thus the carrier may be dipped or sprayed with the complete slurry, until the appropriate amount of slurry is on the carrier. The slurry employed in depositing the catalytically-promoting metal component-high area support composite on the carrier will often contain about 20 to 60 weight percent of finely-divided solids, preferably about 35 to 45 weight percent. Alternatively, the catalyst composition can be used in the form of a self-supporting structure such as a pellet. The composition can be prepared and formed into pellets by known means.

The comminuted catalytically-promoting metal component-high surface area support composition can be deposited on the carrier such as a metal or ceramic honeycomb in a desired amount. For example, the composite may comprise about 2 to 30 weight percent of the coated carrier, and preferably about 5 to 20 weight percent. The composition deposited on the carrier is generally formed as a coated layer over most, if not all, of the surfaces of the carrier contacted. The combined structure may be dried and calcined, preferably at a temperature of at least about 250° C., but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at quite elevated temperatures, e.g. at least about 800° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 600 or more flow channels ("cells") per square inch of cross section, although far fewer may be used. For example, the carrier may have from about 60 to 600, more usually from about 200 to 400, cells per square inch ("cpsi").

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The present invention is illustrated further by the following examples which are not intended to limit the scope of this invention.

EXAMPLE 1

An example composition comprises by weight percent 28 percent ceria ($CeO_2$), 7 percent praseodymia ($Pr_6O_{11}$), 7 percent neodymia ($Nd_2O_3$) and 58 percent zirconia ($ZrO_2$). A process which can be used to make this composition begins with making a zirconium hydroxide sol. This can be made by precipitating zirconium sulfate with sodium hydroxide at high temperature reflux, typically from 90 to 100° C. to make nanometer size crystals (typically up to about 100 nanometers). The sulfur, sodium and other impurities can be washed out with an aqueous liquid. An acid, such as nitric acid $HNO_3$, can be used to break the aggregates to obtain the zirconia hydroxide sol and to reduce the pH of the liquid. At this stage, other components such as cerium, praseodymium and neodymium salts such as nitrates can be added. The compounded sol should be acidic having a pH of preferably 0.5 to 2.0 at this point. The acidic pH helps to keep the salts in solution. The pH is then quickly increased by adding an alkaline compound such as ammonia to precipitate the rare earth compounds. The pH should be controlled to avoid formation of large aggregates. The precipitated material is then washed with an aqueous liquid such as deionized water and dried at suitable conditions in air such as air in an oven at 150° C. for as long as necessary, typically overnight. The precipitate can then be calcined to convert the zirconium, cerium, neodymium and praseodymium components to oxides. The calcination is conducted in air at 550° C. for a period of 2 hours. During this time at least some of the rare earth components diffuse to the zirconia.

EXAMPLE 2

A composition comprising 31 weight percent of ceria, 7.5 weight percent of praseodymia, 7.5 of neodymia and 55 weight percent of zirconia was prepared in the laboratory. A co-precipitate of zirconium, cerium, neodymium and praseodymium nitrates was made. The co-precipitate was made using an aqueous solution containing 50 grams (by weight of the metal) of solid. This comprised 39.74 grams of cerium nitrate, 14.55 grams of neodymium nitrate, 13.86 grams of praseodymium nitrate and 135.73 grams of zirconium nitrate. In accordance with the procedure of the present invention, all of the nitrates were mixed in an acidic solution having a pH of 2 to 3 and heated to 90° C. At this time, 150 milliliters of ammonia and 100 milliliters of peroxide were slowly added to the solution with mixing. The components precipitated out and filtered. A filter cake was obtained and washed twice. The pH after the second wash was about 8.6. The pH of fluid of 100 milliliters of perioxide and 150 milliliters of ammonia was 9.0. The pH of the solution was adjusted to 10.2 by adding water (about 1,000 milliliters). The filter cake was dried at 150° C. overnight and ground and sieved through 100 mesh sieve. The powder was calcined at 550° C. for 2 hours.

EXAMPLE 3

This example illustrates a catalyst composition containing the oxygen storage component as recited in Example 1. The composition is recited based on total percent solids in a catalyst slurry as well as in a loading of grams per cubic inch when loaded onto a ceramic honeycomb cylinder 3.66 inches in diameter by 3 inches long and having 400 cells per square inch where the cells are square and cross section. The composition is deposited on the honeycomb from a slurry of palladium starting with palladium nitrate Pd $(NO_3)_3$ having 3.67 percent solids and resulting in a loading of 0.0868 g/in$^3$ Pd on the honeycomb. The palladium is first loaded on high surface area alumina having a surface specified to be 160 m$^2$/g and average particle size of about 30 micrometers. The slurry contains 51.97 percent solids of Pd supported on the alumina resulting in 1.230 g/in$^3$ of the Pd supported on alumina on the honeycomb. Zirconium is present in the slurry as zirconia acetate at 4.23 percent solids and results 0.100 g/in$^3$ zirconia supported on the honeycomb. Lanthanum is present in the slurry as lanthanum nitrate at 8.03 percent total solids and results 0.190 g/in$^3$ lanthana supported on the ceramic honeycomb. Strontium is present in the slurry as strontium hydroxide with 4.23 percent total solids at a loading of 0.100 g/in$^3$ of SrO on the honeycomb. Neodymium is present in the slurry as neodymium nitrate with 6.76 percent total solids and results in a loading of 0.160 g/in$^3$ neodymium. The oxygen storage component is present in the slurry at 21.13 percent of the total solids and results in a loading of 0.500 g/in$^3$ on the ceramic honeycomb.

The composition can be prepared in a planetary mixer. Initially, the palladium nitrate is mixed with the alumina. This can be transferred to a ballmill and the composition ballmilled. To this, can be added the neodymium nitrate, the lanthanum nitrate and the oxygen storage component as a powder. The mixture can be ballmilled and subsequently strontium oxide and zirconia acetate can be added. Acetic acid, deionized water and octanol are added as necessary to the ballmill. The mixture is ballmilled until 90 percent of solids are less than 10 micrometers with a solids concentration of about 44 percent. The pH and viscosity can be measured and the pH is about 3:4 and the viscosity below about 100 centipoise. The pH and the viscosity can be adjusted to insure homogenous slurry with good coatability. The ceramic honeycomb substrate is dipped into this slurry and air knifed to clear out the channels. The coated substrate pieces are dried and calcined at 550° C. for at least one hour. The dry weight gain should be 2.367 g/in$^3$.

EXAMPLE 4

A composition comprising 34.2 weight percent ceria ($CeO_2$), 7.7 weight percent neodymia ($Nd_2O_3$), 8.3 weight percent praseodymia ($Pr_6O_{11}$) and 49.8 weight percent zirconia ($ZrO_2$) was prepared. The zirconia, rare earth mixed oxide had a specific surface area of 77 m$^2$/g and an average particle size of 1.7 micrometers.

A process which can be used to make the above composition begins with making a zirconium hydroxide sol by precipitating zirconium salts, (e.g., sulfate or nitrate) with sodium hydroxide and refluxing at a high reflux temperature, typically from 90–100° C. The cations and other impurities can be washed out with deionized water. Water soluble sulphur and sodium components and other soluble impurities can be washed out with an aqueous liquid. An acid, such as nitric acid $HNO_3$ can be used to reduce the pH of the sol. The acid can be used to break the aggregates to obtain the zirconia hydroxide sol and to reduce the pH of the liquid.

At this stage, other components such as cerium, praseodymium and neodymium components can be added. Such components can be in the form of nitrates. The compounded sol should be sufficiently acidic, having a pH of preferably 0.5 to 2.0 at this point. The acidic pH helps to keep the sol in solution. The pH can be quickly increased by adding a base compound, such as ammonia to precipitate the rare earth compounds. The pH should be controlled to avoid formation of large aggregates and uneven distribution of components. Typically, this can be accomplished by controlling the flow rate of the base with mixing. A useful pH is about 7.

The precipitated material can then be washed with the deionized water and dried at suitable conditions in air, such as air in an oven at 150° C. for as long as necessary, typically overnight. The precipitate can then be calcined to convert the zirconium, cerium, neodymium and praseodymium components to oxides. The calcination is preferably conducted in air at a suitable temperature, such as 750° C., for a sufficiently long time, up to four hours during which the rare earth elements can diffuse into the zirconia.

EXAMPLE 5

The composite of Example 4 was made and consisted of 34.2 weight percent ceria, 49.8 weight percent zirconia, 7.7 weight percent neodymia and 8.3 weight percent praseodymia was used to make catalyst composition. This was compared, in a catalyst composition, to a catalyst composition which included the composite disclosed in Example 1. The composite of Example 1 consisted of 28 percent ceria, 58 percent zirconia, 7 percent neodymia and 7 percent praseodymia.

The present (Example 5) catalyst composition and a Comparative 5 catalyst composite were made using the above recited composites from Example 4 and Example 1 respectively. The compositions were made using a commercially available gamma alumina powder, having a BET surface area of 150 m$^2$/g impregnated with a rhodium nitrate solution and calcined to contain 0.578 weight percent rhodium (based on the Rh metal). Thirty grams of the rhodium containing powder was further impregnated with a platinum amine salt solution to obtain a 3.68 weight percent platinum loading (based on the Pt metal). The Pt—Rh containing alumina was ballmilled with acetic acid and water to form a slurry. This slurry was designated as Slurry A. Zero point three (0.3) grams of each respective composite referred to above (Example 1, Example 4) was impregnated with a platinum amine salt solution to obtain a 0.3 weight percent platinum loading. To make the Example 5 and Comparative 5 catalyst compositions, each respective platinum containing composite oxide powder was then mixed with an adequate amount of Slurry A and an alumina acetate binder. In each case the combined slurry was dried and calcined at 450° C. to form a catalyst solid. Each catalyst sample contained Pt—RhAl$_2$O$_3$; alumina binder and the respective composite in the weight ratio of (0.7 Pt—RhAl$_2$O$_3$):(1.15 alumina binder):(0.2 of the respective composite). The solid catalyst samples were crushed and sieved to obtain particles of diameter of average 300 μm.

The performance of the catalyst compositions Example 5 and Comparative 5 were compared in a Model Gas Reactor, under aging conditions at 1100° C. for six hours.

In conducting the test, forty milligrams of each catalyst test sample was mixed with 60 milligrams of cordierite particles (300 μm ave. diameter) and loaded into a laboratory Model Gas Reactor. The catalyst compositions were aged at 1100° C. for six hours in a simulated exhaust gas mixture employing a perturbation of ±0.2 air to fuel ratio (A/F) at 0.167 Hz at stoichiometric set point and 350,000 space velocity. The aged catalyst compositions were then evaluated at 500° C. in the same reactor with similar exhaust gas mixture, employing a ±0.1 A/F perturbation. The average feed gas composition at the aging and evaluation conditions contained 0.57% CO, 0.19% H$_2$, 0.19% NO, 0.285% O$_2$, 20 ppm SO$_2$ (2 ppm SO$_2$ in a separated evaluation) and balance N$_2$.

TABLE 1

| | Conversion Rate of CO and NO | | | |
|---|---|---|---|---|
| Catalyst | NO Conversion | | CO Conversion | |
| Sample By | 20 ppm SO$_2$ | 2 ppm SO$_2$ | 20 ppm SO$_2$ | 2 ppm SO$_2$ |
| Comp. 5 | 73 | 86 | 80 | 99 |
| Ex. 5 | 82 | 87 | 94 | 100 |

A review of Table 1 illustrated an unexpected improvement of performance, particularly when the exhaust gas contains higher amounts of SO$_2$.

What is claimed is:

1. A precipitated composite comprising a diluent component in which is incorporated a cerium component, a neodymium component and a praseodymium component, wherein there is:
   45 to 55 weight percent of the diluent component selected from zirconia and zirconia activated alumina;
   30 to 45 weight percent of the cerium component;
   5 to 10 weight percent of the neodymium component; and
   5 to 10 weight percent of the praseodymium component.

2. The composite as recited in claim 1 wherein the diluent component is a zirconium component.

3. The composite as recited in claim 2 wherein there is:
   47 to 53 weight percent of a zirconium component;
   32 to 38 weight percent of a cerium component;
   6 to 10 weight percent of a neodymium component; and
   6 to 10 weight percent of a praseodymium component.

4. The composite as recited in claim 1 wherein the zirconium component comprises zirconia, the cerium component comprises ceria, the neodymium component comprises neodymia, and the praseodymium component comprises praseodymia.

5. The composite as recited in claim 4 wherein the composite is in the form of a particulate oxide composite which consists essentially of zirconia, ceria, neodymia and praseodymia.

6. A catalyst composition comprising:
   at least one precious metal component;
   at least one support on which said precious metal component is located; and
   an oxygen storage composition comprising a precipitated composite, the composite comprising:
      45 to 55 weight percent of the diluent component selected from zirconia and zirconia activated alumina;
      30 to 45 weight percent of the cerium component;
      5 to 10 weight percent of the neodymium component; and
      5 to 10 weight percent of the praseodymium component.

7. The catalyst composition as recited in claim 6 wherein said support is selected from the group consisting of silica, alumina and titania compounds.

8. The catalyst composition as recited in claim 6 wherein the support is activated compounds selected from the group consisting of alumina, silica, silica-alumina, aluminosilicates, alumina-zirconia, alumina-chromia, and alumina-ceria.

9. The catalyst composition as recited in claim 8 wherein the support is activated alumina.

10. The catalyst composition as recited in claim 6 wherein the oxygen storage composite comprises:
    47 to 53 weight percent of a zirconium component;
    32 to 38 weight percent of a cerium component;
    6 to 10 weight percent of a neodymium component; and
    6 to 10 weight percent of a praseodymium component.

11. The catalyst composition as recited in claim 10 wherein the zirconium component comprises zirconia, the cerium component comprises ceria, the neodymium component comprises neodymia, and the praseodymium component comprises praseodymia.

12. The catalyst composition as recited in claim 11 wherein the oxygen storage composition is in the form of a particulate oxide composite which consists essentially of zirconia, ceria, neodymia and praseodymia.

13. The catalyst composition as recited in claim 6 further comprise at least one additional oxygen storage composition.

14. The catalyst composition as recited in claim 13 wherein the additional oxygen storage component is ceria.

15. The catalyst composition as recited in claim 6 further comprising a nickel or iron component.

16. The catalyst composition as recited in claim 6 comprising at least one other material selected from:
    at least one stabilizer;
    at least one other rare earth component; and
    at least one additional zirconium compound.

17. The catalyst composition as recited in claim 16 wherein the stabilizer is at least one alkaline earth metal component derived from a metal selected from the group consisting of magnesium, barium, calcium and strontium.

18. The catalyst composition as recited in claim 17 wherein the at least one alkaline earth metal component is derived from a metal selected from the group consisting of strontium and barium.

19. The catalyst composition as recited in claim 18 wherein the alkaline earth metal component is barium oxide.

20. The catalyst composition as recited in claim 18 wherein the alkaline earth metal component is strontium oxide.

21. The catalyst composition as recited in claim 16 wherein the at least one of said other rare earth metal component is selected from the group consisting of lanthanum components and neodymium components.

22. The catalyst composition as recited in claim 21 wherein the at least one other rare earth component is derived from neodymium.

23. The catalyst composition as recited in claim 16 wherein the at least one other rare earth component is derived from lanthanum.

24. The catalyst composition as recited in claim 16 wherein further comprising the additional zirconia compound.

25. The catalyst composition as recited in claim 16 comprising:
    from about 0.0175 to about 0.3 g/in$^3$ of a precious metal component;
    from about 0.15 to about 3.0 g/in$^3$ of the support;
    from about 0.01 to about 2.5 g/in$^3$ of the oxygen storage composite;
    from about 0.025 to about 0.5 g/in$^3$ of at least one alkaline earth metal component;
    from about 0.025 to about 0.5 g/in$^3$ of the additional zirconium component;
    from about 0.025 to about 0.5 g/in$^3$ each of at least one of the other rare earth components selected from the group consisting of a ceria metal components, a lanthanum metal components and a neodymium metal components.

26. The catalyst composition as recited in claim 25 which further comprises from about 0.025 g/in$^3$ to about 0.5 g/in$^3$ of a nickel component.

27. The catalyst composition as recited in claim 25 wherein the precious metal is palladium, the support is alumina, the oxygen storage composite comprises:
    47 to 53 weight percent of a zirconium component;
    32 to 38 weight percent of a cerium component;
    6 to 10 weight percent of a neodymium component;
    6 to 10 weight percent of a praseodymium component;
    and further comprising lanthana and neodymia.

28. The catalyst composition as recited in claim 6 wherein the composite is in the form of a pellet.

29. The catalyst composition as recited in claim 6 in the form of a layer which is supported on a substrate.

30. The catalyst composition as recited in claim 29 wherein the substrate comprises a honeycomb carrier.

* * * * *